United States Patent [19]
Ibaraki et al.

[11] Patent Number: 5,800,792
[45] Date of Patent: Sep. 1, 1998

[54] EXHAUST GAS TREATMENT UNIT AND METHOD

[75] Inventors: Yoshihiro Ibaraki; Hidekazu Ina; Hideji Kawanaka, all of Tokyo, Japan

[73] Assignee: Teisan Kabushiki Kaisha, Tokyo, Japan

[21] Appl. No.: 646,329

[22] PCT Filed: Nov. 28, 1995

[86] PCT No.: PCT/JP95/02415

§ 371 Date: Jun. 4, 1996

§ 102(e) Date: Jun. 4, 1996

[87] PCT Pub. No.: WO96/16720

PCT Pub. Date: Jun. 6, 1996

[30] Foreign Application Priority Data

Nov. 29, 1994 [JP] Japan ................... 6-294651

[51] Int. Cl.$^6$ ................... C01B 33/113; B01D 53/34
[52] U.S. Cl. ................... 423/210; 423/240.5; 423/245.3; 422/109; 422/110; 422/168; 422/173; 422/174; 422/178; 422/212; 422/171
[58] Field of Search ................... 422/168, 171, 422/173, 174, 178, 198, 199, 109, 212, 110; 165/122, 95; 55/222; 431/5, 7; 588/205, 900; 423/245.3, 210, 240 S

[56] References Cited

U.S. PATENT DOCUMENTS

| | | | |
|---|---|---|---|
| 2,141,873 | 12/1938 | Modine | 165/122 |
| 2,258,790 | 10/1941 | Murphy | 165/122 |
| 3,052,105 | 9/1962 | Bowman et al. | 55/222 |
| 4,420,313 | 12/1983 | Hada et al. | 422/178 |
| 5,538,702 | 7/1996 | Smith et al. | 423/210 |

FOREIGN PATENT DOCUMENTS

| | | |
|---|---|---|
| 0597393 | 5/1994 | European Pat. Off. . |
| 0611140 | 8/1994 | European Pat. Off. . |
| 8911905 | 12/1989 | WIPO ................... 423/240 S |

*Primary Examiner*—Hien Tran
*Attorney, Agent, or Firm*—Burns, Doane, Swecker & Mathis, L.L.P

[57] ABSTRACT

The present invention relates to an exhaust gas treatment unit which possesses a stable treating capacity, with a reduced running cost. The exhaust gas treatment unit removes noxious gases such as monosilane contained in an exhaust gas by thermal decomposition. The exhaust gas treatment unit includes a heating drum (5) into which the exhaust gas and oxygen or air are introduced and a heating source (6) disposed on the outer periphery of the heating drum (5) so as to heat the inside of said heating drum (5). A temperature sensor (14) detects the temperature of the inside of said heating drum (5) in the vicinity of its outlet and a controller (16) controls the heating source (6) in accordance with a detected temperature value from the temperature sensor (14) so that the temperature of the inside of said heating drum (5) in the vicinity of the outlet is maintained within a predetermined temperature range. An air-cooled type cooling device (2) is connected to the outlet of the heating drum (5) to cool the exhaust gas. The running cost of the invention is lower than the running cost for other known devices in a large extent because metal oxide and chemical agents are not used in contrast to a chemical reaction type exhaust gas treatment unit.

21 Claims, 2 Drawing Sheets

5,800,792

1

EXHAUST GAS TREATMENT UNIT AND METHOD

FIELD OF THE INVENTION

The present invention relates to an exhaust gas treatment unit for subjecting an exhaust gas discharged from a semiconductor manufacturing installation or the like to a treatment for removing harmful substances, and more particularly, to an exhaust gas treatment unit for removing harmful gases such as monosilane ($SiH_4$), phosphine ($PH_3$), hydrogen nitride ($NH_3$) and nitrogen fluoride ($NF_3$) contained in an exhaust gas by thermally oxidative decomposition.

DESCRIPTION OF THE RELATED ART

In the manufacture of semiconductors, an exhaust gas is generated which contains noxious gases such as $SiH_4$, $PH_3$, $NH_3$ and $NF_3$. In accordance with the law (High Pressure Gas Control Law), manufacturers are obligated to install an exhaust gas treatment unit in order to treat the discharged exhaust gas and to discharge the exhaust gas only after the noxious gases have been removed or made harmless. The law sets Threshold Limit Values (TLV) for noxious gases which are the maximum allowable amounts of these gases which may be present in discharged exhaust gases. Known types of exhaust gas treatment units for removal of these gases include a chemical reaction type treatment unit for removing noxious gases by an oxidative or neutralization reaction using a neutralizing agent such as metal oxides or caustic soda (sodium hydroxide). Other known types of exhaust gas treatment units include wet scrubber type units or combustion type units which burn the exhaust gas using a gas burner.

In conventional exhaust gas treatment units, such as those mentioned above, there are various problems. In a chemical reaction type treatment unit high expense and substantial labor are required for exchanging the chemical agents or metal oxides used in the treatment. In the case of a wet scrubber type treatment unit, large amounts of washing water and an absorbing liquid are required. In addition, a waste water treatment installation is necessary to treat the washing water.

In the case of a combustion type treatment unit, a combustion improver such as hydrogen or methane and a large amount of air or oxygen are necessary for combustion. A water cooling installation is also necessary for cooling the exhaust gas because the exhaust gas exit temperature in a is combustion type treatment unit is high. Furthermore, there is a problem with combustion treatment in that deposits such as reaction products are easily deposited on the inside of a combustion reactor which must be periodically removed.

OBJECTS AND SUMMARY

It is therefore an object of the present invention to produce an exhaust gas treatment unit in which the aforementioned problems are addressed.

In order to achieve the aforementioned object according to the present invention, an exhaust gas treatment unit for removing noxious gases contained in an exhaust gas by thermal decomposition includes a heating drum into which the exhaust gas and oxygen are introduced, a heating source disposed on the outer periphery of the heating drum so as to heat the inside of the heating drum, a temperature detection means for detecting the temperature of the inside of the heating drum in the vicinity of its outlet, a control means for controlling the heating source in accordance with a detected value from the temperature detection means so that the temperature of the inside of the heating drum in the vicinity of its outlet is maintained within a predetermined temperature range, and an air-cooled type cooling device connected to the outlet of the heating drum. In addition, the predetermined temperature range within the heating drum is preferably 350° C.–500° C.

BRIEF DESCRIPTION OF THE DRAWING FIGURES

The invention will be described in greater detail with reference to the accompanying drawings, wherein:

FIG. 1 is a schematic view of one embodiment of the exhaust gas treatment unit according to the present invention; and FIG. 2 is a graph of experimental results obtained by using the exhaust gas treatment unit according to the present invention.

DETAILED DESCRIPTION OF THE PREFERRED EMBODIMENTS

Figure 1:
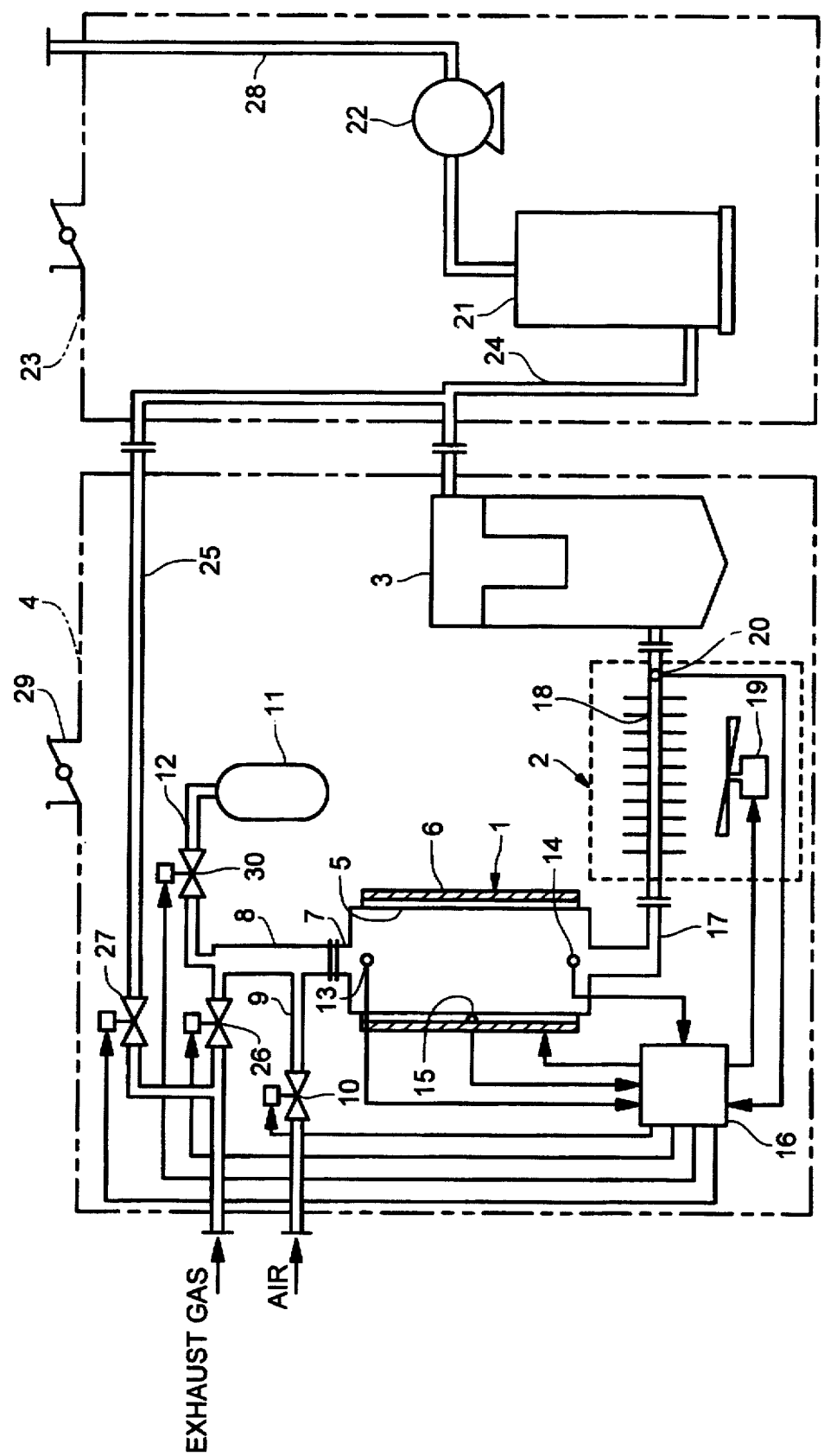

FIG. 1 is a schematic view illustrating one embodiment of the exhaust gas treatment unit according to the present invention. The exhaust gas treatment unit of FIG. 1 is provided for treating and removing $SiH_4$ contained in an exhaust gas consisting mainly of nitrogen gas $N_2$ coming from a semiconductor manufacturing installation (not shown).

The exhaust gas treatment unit includes a heating device 1, a cooling device 2, and a filtering device 3. The heating device 1 heats the exhaust gas and air or oxygen introduced to the heating device. The heated $SiH_4$ in the exhaust gas is oxidatively decomposed and is converted to harmless silicon oxide ($SiO_2$). The cooling device 2 cools the treated gas discharged from the heating device 1 and the filtering device 3 removes the harmless $SiO_2$ from the treated gas. In order to prevent the exhaust gas or the treated gas from being released to the atmosphere, the heating device 1, cooling device 2, and filtering device 3 are preferably accommodated in a casing 4 which is ventilated.

In the heating device 1 of the present invention, when the inside of the heating device is heated by a heating source, noxious gases such as $SiH_4$, in the exhaust gas are thermally decomposed by the heat. In order for the noxious gases to be decomposed, the quantity of air or oxygen introduced into the heating drum must be of a sufficiently minimum quantity to allow the oxidation of the oxidatively decomposable noxious gases.

By controlling the heating source with a temperature detection means and a control means, the temperature of the inside of the heating device 1, and especially in the vicinity an outlet of the heating device is kept almost constant and hence the oxidative decomposition reaction is stabilized. After the thermal oxidative decomposition, the treated gas which is discharged from the outlet of the heating drum is cooled down to a desired temperature by means of the air-cooled type cooling device 2.

The heating device 1 is composed of a cylindrical heating drum 5 and a cylindrical electric heater 6 disposed so as to surround the periphery of the heating drum 5. The heating drum 5 is positioned within the casing 4 with an axis of the heating drum substantially vertical. An inlet nozzle 7 at the upper end of the heating drum 5 is connected to an exhaust gas introduction pipe 8 for introducing an exhaust gas from a semiconductor manufacturing installation. An air introduction pipe 9 for introducing air containing oxygen which is necessary for oxidizing the $SiH_4$ in the exhaust gas is connected to the exhaust gas introduction pipe 8. The air introduction pipe 9 has a flow rate regulation valve 10 provided therein. By adjusting this flow rate regulation valve 10, air in an amount corresponding to the amount of oxygen used in oxidation of the $SiH_4$ in the exhaust gas can be supplied into the heating drum 5.

In the embodiment illustrated in FIG. 1, a gas header 11 is provided for removing oxidation products from the interior surfaces of the heating drum 5. The gas header 11 is filled with nitrogen or air under pressure and is connected to the exhaust gas introduction pipe 8 by way of a header gas introduction pipe 12. The header gas introduction pipe 12 is provided with a valve 30 in order to instantaneously send out compressed nitrogen or the like into the heating drum 5 so that oxidation products deposited on the inner wall surfaces of the heating drum 5 are shaken down off the wall surfaces of the drum.

Temperature sensors 13,14 are disposed at the upper portion and the lower portion of the inside of the heating drum 5. A temperature sensor 15 is also attached at the inner surface of the electric heater 6 between the electric heater and the heating drum 5. The temperature sensors 13,14,15 are connected to a controller 16 for controlling the various valves and the electric heater 6. The controller 16 is adapted to receive detected temperature signals from the temperature sensors 13,14,15 and to control the electric heater 6 and the air flow rate regulation valve 10 so that the thermally oxidative decomposition of $SiH_4$ is properly carried out within the heating drum 5.

An outlet nozzle 17 at the lower end of the heating drum 5 is connected to the cooling device 2. The cooling device 2 is of an air cooled type, and includes an air-cooled pipe equipped with fins (hereinafter referred to as "an air-cooled finned pipe") 18 connected to the outlet nozzle 17 of the heating drum 5 and a fan 19 for forcibly passing air over the fins of the air-cooled finned pipe 18. In the embodiment of FIG. 1, a temperature sensor 20 is provided inside of the outlet portion of the air-cooled finned pipe 18. In accordance with a detected temperature signal from this temperature sensor 20, the controller may determine whether the air-cooled finned pipe 18 and the fan 19 are operating properly to sufficiently cool the exhaust gas.

The outlet end of the air-cooled finned pipe 18 is connected to the filtering device 3. The filtering device 3 serves to remove fine particles of $SiO_2$ resulting from oxidation of the $SiH_4$ and other oxidation products contained in the treated gas by filtration. Preferably, a bag filter is used to remove the oxidation products such as the fine particles of $SiO_2$. Other dust removing equipment, for example a cyclone, can also be used.

The rear stage of the filtering device 3 in the embodiment of FIG. 1, is preferably connected to a harmful substance removing device 21 for a final treatment of the exhaust gas. The exhaust gas exiting from the harmful substance removal device is exhausted by an exhausting blower 22. Although the removing device 21 and the blower 22 may be accommodated in the casing 4, they are optional devices and could also be accommodated as a separate unit in a second casing 23, as illustrated in the drawing.

The harmful substance removing device 21 is preferably a so called dry chemical treatment device which is adapted to completely remove the extremely small quantity of harmful gases remaining in the treated gas by a treatment using proper chemicals agents. A pipe 24 between the filtering device 3 and the harmful substance removing device 21 is connected a by a by-pass pipe 25 to the exhaust gas introduction pipe 8. By controlling a valve 26 in the exhaust gas introduction pipe 8 and a valve 27 in the by-pass pipe 25, accordingly, it becomes possible to directly introduce the exhaust gas into the harmful substance removing device 21. This by-pass pipe 25 serves also to back up the heating device 1 when any problems occur therein.

The outlet of the harmful substance removing device 21 is connected the exhausting blower 22. The terminal end of an exhaust pipe 28 extending from the discharge port of the exhausting blower 22 opens outside of the casing 23. Because of the existence of this exhausting blower 22, the whole interior of the exhaust gas treating system illustrated in the drawing is at a negative pressure. Therefore, it is possible to introduce air for oxidation into the heating drum 5 by suction directly from the atmosphere. It is not necessary to provide a compressed air cylinder or the like to introduce the oxidation air to the heating drum.

In such a construction as mentioned above, the exhausting blower 22 is constantly driven when the exhaust gas treatment unit is in a normal running condition. The exhaust gas and air are consequently sucked into the heating drum 5 through the exhaust gas introduction pipe 8 and air introduction pipe 9, respectively. Since $SiH_4$ in the exhaust gas is oxidized when it is brought into contact with air, it can be determined from the temperature detected by the temperature sensor 13 provided in the upper portion of the heating drum 5, that the exhaust gas and air have been introduced. In a case where the temperature detected by the temperature sensor 13 exceeds a predetermined value, it can be determined that the concentration of $SiH_4$, in the exhaust gas has been increased over a normal quantity. In order to avoid any danger, a danger signal will be produced when the temperature exceeds the predetermined value. The quantity of air to be introduced into the heating drum 5 will then be adjusted to increase the air flow according to the danger signal. In addition, an amount of oxygen necessary for carrying out the thermally oxidative decomposition of $SiH_4$ contained in the exhaust gas is sufficiently supplied by the air supply, as opposed to a combustion type exhaust gas treatment unit using a gas burner or the like were larger amounts of oxygen are required.

Since the inside of the heating drum 5 is heated by the electric heater 6, the oxidative reaction of $SiH_4$ in the exhaust gas introduced into the heating drum 5 and oxygen in the air is accelerated. In a case where the temperature detected by the temperature sensor 14 provided in the lower portion of the heating drum 5, i.e. in the vicinity of the outlet portion thereof, is 350° C. or more, the concentration of $SiH_4$ remaining in the treated gas discharged from the heating drum 5 is 1 ppm or less because almost 100% of the $SiH_4$, in the exhaust gas has decomposed. This is an excellent value that is remarkably lower than the TLV value of 5 ppm specified by law.

Figure 2:
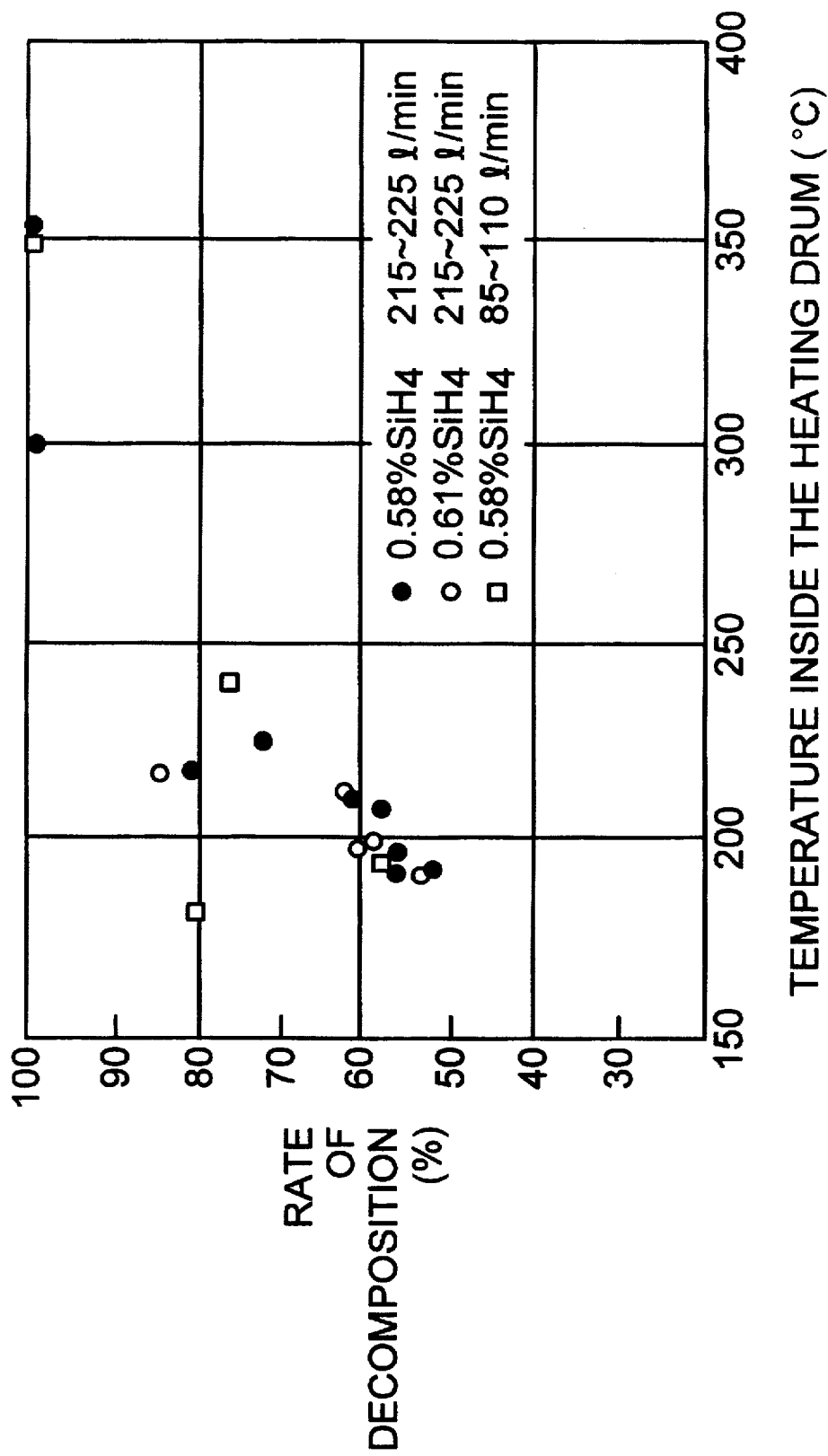

Experimental results obtained when an exhaust gas is actually subjected to a thermally oxidative decomposition by use of the exhaust gas treatment unit equipped with the heating drum 5 are shown in FIG. 2. In this experiment, two kinds of exhaust gases were used in which the concentrations of $SiH_4$ were 0.58% and 0.61%. In the case of the exhaust gas in which the concentration of $SiH_4$, was 0.58%, the experiments were carried out at exhaust gas flow rates regulated to be 215~225 l/min and 85~110 l/min. In the case of the exhaust gas in which the concentration Of $SiH_4$ was 0.61%, the experiment was carried out at an exhaust gas flow rate of 215~225 l/min. As can be seen from FIG. 2, it is exhibited that when the temperature of the outlet portion of the heating drum 5 is 250° C., the rate of decomposition of $SiH_4$ is as high as 80% in each case, and when the temperature is 350° C. or more, the rate of decomposition thereof is nearly 100%. In other words, if the temperature of the outlet portion inside of the heating drum 5 is maintained at 350° C., $SiH_4$ in the exhaust can be almost completely decomposed so as to be made harmless irrespective of variations in the flow rate of the exhaust gas and the concentration of $SiH_4$. When the outlet temperature becomes 1,000° C. or more, on the other hand, nitrogen in the exhaust gas and in the air is oxidized to produce $NO_x$.

In order to enhance the cooling efficiency in the cooling device 2, it is preferred that the temperature of the gas discharged from the heating drum 5 is made as low as possible. Accordingly, the controller 16 is adapted to receive a detected temperature signal from the temperature sensor 14 and to control the electric heater 6 so that the temperature of the outlet portion inside of the heating drum 5 is maintained within a range of 350° C.~500° C. After the electric heater 6 has been adjusted, another detection signal is fed back from the temperature sensor 15, and hence the temperature regulation is rapidly carried out.

The exhaust gas which has been heated so as to be oxidatively decomposed is discharged from the outlet nozzle 17 of the heating drum 5, and is then introduced into the air-cooled finned pipe 18 of the cooling device 2. While flowing through this air-cooled finned pipe 18, the treated gas is cooled down by air from the fan 19 passing over the fins. In a case where the temperature of the treated gas which has reached the outlet portion of the air-cooled finned pipe 18 is higher than a predetermined temperature, the fan 19 is determined to be abnormal and a warning signal will be produced. In addition, the high temperature air which has received heat from the air-cooled finned pipe 18 is discharged from a ventilation duct 29 provided on the upper portion of the casing 4 to the atmosphere.

The treated gas which has been cooled down in the cooling device 2 is then introduced into the filtering device 3 so as to be freed of fine particles of the harmless $SiO_2$ and the like produced by the thermally oxidative decomposition of the $SiH_4$. Since the concentration of $SiH_4$, in the treated gas which has been passed through the filtering device 3 is 1 ppm or less, it is permissive to discharge this treated gas directly to the outside atmosphere. In order to ensure the perfect treatment of the exhaust gas in the illustrated embodiment the harmful substance removing device 21 is connected to the rear stage of the filtering device 3. An extremely fine amount of $SiH_4$ remaining in the treated gas is, therefore, completely removed by its oxidative reaction in the harmful substances removing device 21. Thus, the gas which has been finished in the exhaust gas treatment as mentioned above is released from the exhausting blower 22 to the atmosphere outside of the casing 23 through the exhaust pipe 28.

The foregoing description relates to a usual treating situation. In a case where any abnormality is detected in the heating device 1 for any reason, the valve 26 is closed and the valve 27 is opened in accordance with an instruction from the controller 16. In such a case, the exhaust gas is introduced directly into the harmful substance removing device 21 so that $SiH_4$ in the exhaust gas is chemically removed and the heating device is by-passed. Furthermore, in a case where any gas not suitable for being subjected to the thermally oxidative decomposition is admixed in an exhaust gas, it is also possible that the valves 26,27 can be controlled to send the exhaust gas directly into the harmful substance removing device 21.

The heating drum 5 is preferably shaped in a simple cylindrical form and has no unevenness on its inner wall surface so that it is more difficult for oxidation products to be deposited on the inner wall surface of the heating drum 5. In a case where the treatment of an exhaust gas is continued for a long period of time, however, oxidation products may be deposited on the inner wall surface of the heating drum 5. In such a case, the valve 30 is opened to instantaneously supply a large amount of compressed nitrogen or compressed air from the gas header 11 into the heating drum 5, whereby such deposits on the inner wall surface of the heating drum 5 can be instantaneously removed.

Although the exhaust gas treatment unit according to the aforementioned embodiment is adapted to remove $SiH_4$ from an exhaust gas stream, the invention is also applicable to various noxious gases such as $PH_3$, $NH_3$, $NF_3$, TEOS, TMB and $C_2F_6$. In a case where another gas is treated, it will be easily understood that it is necessary to control the temperature of the outlet portion of the heating drum 5 according to the particular gas.

Even in the case of a gas which cannot be completely decomposed, in the heating drum 5, the complete treatment of such a gas can be carried out by the exhaust gas treatment unit in combination with a chemical treatment unit as shown in the embodiment of FIG. 1.

As can be seen from the foregoing description, the present invention exhibits many advantages. Since the exhaust gas treatment unit according to the present invention is constructed such that the inside of the heating drum is heated by a heating source such as an electric heater provided in the outside and noxious gases in an exhaust gas are heated by its heat so as to be oxidatively decomposed, chemical agents and metal oxides as used in a chemical reaction type exhaust gas treatment units are unnecessary, and washing liquid and absorption liquid as used in a wet scrubber are also unnecessary.

In addition, in the exhaust gas treatment unit according to the present invention, fuel for combustion and cooling water are unnecessary as opposed to a combustion type exhaust gas treatment unit using a gas burner or the like. Accordingly, the running cost of the exhaust gas treatment unit according to the present invention is remarkably decreased, as compared with the conventional treatment units.

Since the structure of the heating drum is simple, the attachment and separation and the maintenance of the heating drum are also simplified. In addition, it is difficult for oxidation products to be deposited on the inside of the heating drum by virtue of its structure, and hence the heating drum can be operated continuously for long periods of time. Since the heating source in the present invention is not in direct contact with the exhaust gas less heat from the heating source is consumed. In addition, due to the controlled temperature of the exhaust gas at the outlet portion of the heating drum the decomposition reaction is stable.

In the exhaust gas treatment unit according to the present invention, the quantity of air for oxidation is controlled to a minimum quantity necessary for decomposing the noxious gases. In contrast, a large amount of air is required combustion type units where a gas burner is used. As a result, the power required for introduction of air is also reduced. Finally, since the treated gas is cooled down by the air-cooled type cooling device, there is no need for water as a cooling medium. Accordingly, there is no need for supplying water or the like and for providing any treating apparatus for the water, thus, the cooling device can be made simple in structure.

While the invention has been described in detail with reference to a preferred embodiment thereof, it will be apparent to one skilled in the art that various changes and modifications can be made, and equivalents employed, without departing from the spirit and scope of the invention.

We claim:

1. An exhaust gas treatment unit for removing noxious gases contained in an exhaust gas by thermal decomposition comprising;
    a heating chamber into which exhaust gas and oxygen are introduced, the heating chamber having an outlet;
    a heating source disposed at an outer periphery of said heating chamber so as to heat an inside of said heating chamber;
    a temperature detector for detecting a temperature of the inside of said heating chamber in a vicinity of the outlet and outputting a detected temperature value;
    a valve for controlling the flow of oxygen into the heating chamber;
    a controller for controlling said heating source in accordance with the detected temperature value from said temperature detector so that the temperature of the inside of said heating chamber in the vicinity of the outlet is maintained within a predetermined temperature range, and for controlling the flow of oxygen into the heating chamber in accordance with the detected temperature value; and
    a cooling device connected to the outlet of said heating chamber.

2. An exhaust gas treatment unit according to claim 1, wherein the controller is set to control the heating source such that the temperature of the inside of said heating chamber in the vicinity of the outlet is maintained within the temperature range of from 350°–500° C.

3. An exhaust gas treatment unit according to claim 1, further comprising a filtering device for removing oxidation products from the exhaust gas exiting the cooling device.

4. An exhaust gas treatment unit according to claim 1, wherein the cooling device is an air-cooled cooling device.

5. An exhaust gas treatment unit according to claim 4, wherein the air-cooled cooling device includes a cooling pipe having fins on an exterior surface thereof and a fan for forcing air across the fins.

6. An exhaust gas treatment unit according to claim 1, further comprising means for removing oxidation products from an inside surface of the heating chamber.

7. An exhaust gas treatment unit according to claim 6, wherein the means for removing oxidation products includes a compressed gas source for introducing compressed gas into the heating chamber to remove oxidation products which have been deposited on the inside surface of the heating chamber.

8. An exhaust gas treatment unit according to claim 1, wherein the heating chamber is a substantially cylindrical heating drum.

9. An exhaust gas treatment unit according to claim 8, wherein the heating source is a cylindrical electric heater disposed around the outer periphery of the heating drum.

10. An exhaust gas treatment unit according to claim 8, wherein the substantially cylindrical heating drum has an axis which is positioned vertically.

11. An exhaust gas treatment unit according to claim 1, wherein the heating chamber and the cooling device are positioned within a ventilated casing to prevent exhaust gas from being released to the atmosphere.

12. The exhaust gas treatment unit of claim 1, wherein more than one temperature detector is used to detect the temperature of the inside of the heating chamber.

13. The exhaust gas treatment unit of claim 1, wherein the unit further comprises an inlet for the introduction of each the oxygen and exhaust gas, with the inlet being connected to a nozzle, through which the oxygen and exhaust gas are introduced into the heating chamber.

14. A method of exhaust gas treatment for removing noxious gasses contained in an exhaust gas comprising:
    introducing an exhaust gas containing noxious gasses into a heating chamber;
    introducing oxygen into the heating chamber;
    heating the exhaust gas so as to thermally oxidatively decompose the noxious gasses;
    controlling the temperature of the heating chamber by controlling a heating source in accordance with a temperature value detected by a temperature sensor within the heating chamber;
    controlling the flow of oxygen into the heating chamber in accordance with a temperature value detected by a temperature sensor within the heating chamber; and
    cooling the exhaust gas exiting the heating chamber.

15. A method of exhaust gas treatment according to claim 14, further comprising a step of filtering the exhaust gas to remove oxidation products.

16. A method of exhaust gas treatment according to claim 14, wherein $SiH_4$ is a noxious gas contained in the exhaust gas and the heating step causes the $SiH_4$ in the exhaust gas to be oxidatively decomposed and converted to $SiO_2$.

17. A method of exhaust gas treatment according to claim 16, further comprising a step of filtering the exhaust gas to remove the $SiO_2$.

18. A method of exhaust gas treatment according to claim 14, wherein the temperature of the heating chamber is controlled to between 350°–500° C.

19. A method of exhaust gas treatment according to claim 14, further comprising a step of removing oxidation products from an inside surface of the heating chamber by introducing pressurized gas to the heating chamber.

20. A method of exhaust gas treatment according to claim 14, wherein the step of cooling the exhaust gas includes cooling the exhaust gas in an air-cooled device.

21. The method of claim 14, wherein more than one temperature sensor is used within the heating chamber.

* * * * *